(12) United States Patent
Ripberger et al.

(10) Patent No.: US 7,899,754 B2
(45) Date of Patent: Mar. 1, 2011

(54) ENABLEMENT OF SYSTEM FEATURES WITH IMPROVED FEATURE KEY

(75) Inventors: Richard A Ripberger, Tucson, AZ (US); Helena C Burton, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1463 days.

(21) Appl. No.: 11/003,866

(22) Filed: Dec. 3, 2004

(65) Prior Publication Data

US 2006/0122945 A1    Jun. 8, 2006

(51) Int. Cl.
*G06Q 99/00* (2006.01)
(52) U.S. Cl. .......................... 705/71; 705/51
(58) Field of Classification Search .............. 705/50–79
See application file for complete search history.

(56) References Cited

U.S. PATENT DOCUMENTS

| | | | | |
|---|---|---|---|---|
| 5,771,287 | A * | 6/1998 | Gilley et al. | 713/191 |
| 5,940,510 | A * | 8/1999 | Curry et al. | 705/65 |
| 6,219,652 | B1 * | 4/2001 | Carter et al. | 705/59 |
| 7,200,697 | B1 * | 4/2007 | Yamamoto et al. | 710/65 |
| 2001/0044782 | A1 * | 11/2001 | Hughes et al. | 705/59 |
| 2002/0165677 | A1 * | 11/2002 | Lightbody et al. | 702/62 |
| 2003/0115069 | A1 | 6/2003 | Pence et al. | |
| 2003/0163712 | A1 * | 8/2003 | LaMothe et al. | 713/189 |
| 2003/0191958 | A1 | 10/2003 | Gartside et al. | |
| 2004/0125954 | A1 | 7/2004 | Riebe et al. | |
| 2004/0127196 | A1 | 7/2004 | Dabbish et al. | |
| 2005/0171898 | A1 * | 8/2005 | Bishop et al. | 705/39 |

OTHER PUBLICATIONS

Derfler, "How Networks Work", Bestseller Edition, 1996, Ziff-Davis Press, Emeryville, CA, all pages.*
White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
Tate et al., "Implementing an Open IBM SAN", 2003, IBM.*

* cited by examiner

*Primary Examiner*—Andrew J. Fischer
*Assistant Examiner*—Jacob C. Coppola
(74) *Attorney, Agent, or Firm*—Dan Shifrin (57) ABSTRACT

A feature key is provided to enable a specific feature in a target system, such as an IBM® Enterprise Storage Server®. The key includes fields identifying at least a portion of a serial number of the target system, identifying the feature on the target system to be enabled, and identifying a quantity associated with the feature to be enabled. Including the serial number ensures that the feature key will enable the feature on only the designated system and including the quantity ensures that only the quantity (of storage space, for example) paid for by the customer will be enabled. Additional fields may also be included identifying a storage architecture on which the feature is to be enabled, identifying a machine on which the feature is to be enabled, and identifying a sequence of prior feature keys generated for the feature on the target system. Preferably, the key is encrypted with an algorithm which uses at least a portion of the serial number of the target system, thereby ensuring that the feature key may be decrypted only by the target system.

19 Claims, 4 Drawing Sheets

ENABLEMENT OF SYSTEM FEATURES WITH IMPROVED FEATURE KEY

TECHNICAL FIELD

The present invention relates generally to selective enablement of features in a system and, in particular to ensuring that only features paid for by a customer are enabled.

BACKGROUND ART

Many customers of large computer systems purchase systems or subsystems having features which can be enabled via the purchase of additional Licensed Machine Code (LMC) features. For example, a customer may install an IBM® Enterprise Storage Server® (ESS) Model 800 with 6 TB of disk capacity and then purchase additional LMC feature codes for the FlashCopy function which provides the ability to make an instantaneous copy of data between to extents on two or more disks. The LMC feature codes for the advanced functions may be ordered on a given machine serial number via specific feature codes for a specific advanced function at a specific capacity point (e.g. 1, 2, 5, 10, 20, 30, or 40 TBs). Each feature code has a different pricing and upgrades between one enablement level and the next are net priced at the difference between the from-level price and the to-level price. Once ordered, the features codes are stored in the ordering system against a specific machine serial number and the service organization has the capability through an internet web interface to download an LMC feature file to a diskette that is encrypted with a machine serial number dependent encryption key. The data in the file contains a machine serial number and indicators for the specific feature codes ordered. This diskette is loaded on a given machine, decrypted by the machine, validated by the machine, and applied by the machine. Changes to the feature code set could be applied to the machine by repeating this process after ordering (or removing) additional LMC features. The machine validated the LMC feature file by ensuring that the decrypted file contained the machine serial number and additionally that there were no LMC features specified with a capacity enablement point less than the installed capacity of the type that the particular feature was applicable to. For example, in the case of the FlashCopy LMC feature, the amount of capacity enablement was applicable to all capacity configured on the machine. In the case of the XRC LMC feature, the amount of LMC feature enablement was applicable to only the CKD capacity configured on the machine. Once the LMC feature file was validated and applied, any LMC feature with a capacity enablement established a maximum limit on the amount of the applicable capacity which could be configured. The storage installed in the machine is considered configured when the disks are configured into an array and the physical capacity of disks used in the array are counted against the configured capacity. LMC features not indicated in the LMC feature file are not enabled on a given machine. LMC features with a defined capacity limit are enabled on a given machine and are available on all configured capacity of the type that the advanced function applies to.

The above described scheme has some limitations which should be overcome to address more flexible marketing offerings and to address capabilities found in follow-on products. The following characteristics are desirable:

a) an enablement mechanism that allows a more granular level of capacity enablement over a greater range of capacity with out requiring a corresponding increase in the number of product feature codes;

b) an enablement mechanism that allows advanced functions to be designated for more than one capacity type option. For instance, it would be desirable to selectively enable the FlashCopy function on just the fixed block storage, just the CKD storage, or on both the fixed block and CKD storage;

c) an ability to allocate the capacity enablement of a given advanced function across multiple virtual machine images installed on the machine (the current ESS Model 800 had only a single machine image but follow-on products may have more than one, each identified by a unique serial number derived from the machine serial number and each capable of appearing to attached hosts as a separate machine). This allocation should be managed in a way that the total of the enablement on all machine images does not exceed the enablement purchased for the machine;

d) an ability to perform enablement through customer accessible interfaces that do not depend on a particular digital medium, including supporting the capability for a human to enter the enablement through the product supported GUI interfaces;

e) an ability to manage the enablement of a given function without having to manage or affect other independent functions;

f) an ability to provide the customer access to the set of features enabled on his machine in clear text from a generally accessible interface and without allowing general access to the installed features across the entire machine population; and g) an ability to maintain the existing characteristics of the current implementation relative to providing a machine specific enablement that prevents enablement of functions without prior purchase.

SUMMARY OF THE INVENTION

The present invention provides a method for generating a feature key to enable a specific feature in a target system, such as an IBM Enterprise Storage Server. The key includes fields identifying at least a portion of a serial number of the target system, identifying the feature on the target system to be enabled, and identifying a quantity associated with the feature to be enabled. Including the serial number ensures that the feature key will enable the feature on only the designated system and including the quantity ensures that only the quantity (of storage space, for example) paid for by the customer will be enabled. Additional fields may also be included identifying a storage architecture on which the feature is to be enabled, identifying a machine on which the feature is to be enabled, and identifying a sequence of prior feature keys generated for the feature on the target system. Preferably, the key is encrypted with an algorithm which uses at least a portion of the serial number of the target system, thereby ensuring that the feature key may be decrypted only by the target system.

To obtain the key, a customer transmits a request to a key server. The request includes at least a portion of the serial number of the customer device on which the feature is desired to be enabled. Upon receipt of the request, the server verifies that the serial number is valid and that the customer device is licensed to the requested feature and in the requested quantity. After the request is verified, the key is generated, encrypted and transmitted back to the customer device. The customer device attempts to decrypt the key. If the key was encrypted with the serial number, a reverse algorithm is applied to the key. If the key is successfully decrypted, the customer device then can enabled the feature. Preferably, the customer device then generates and transmits to the server a "signature" confirming that the feature has been enabled. The signature is used by the server to maintain an updated inventory of the features enabled on the customer device.

DETAILED DESCRIPTION OF THE PREFERRED EMBODIMENT

Figure 1:
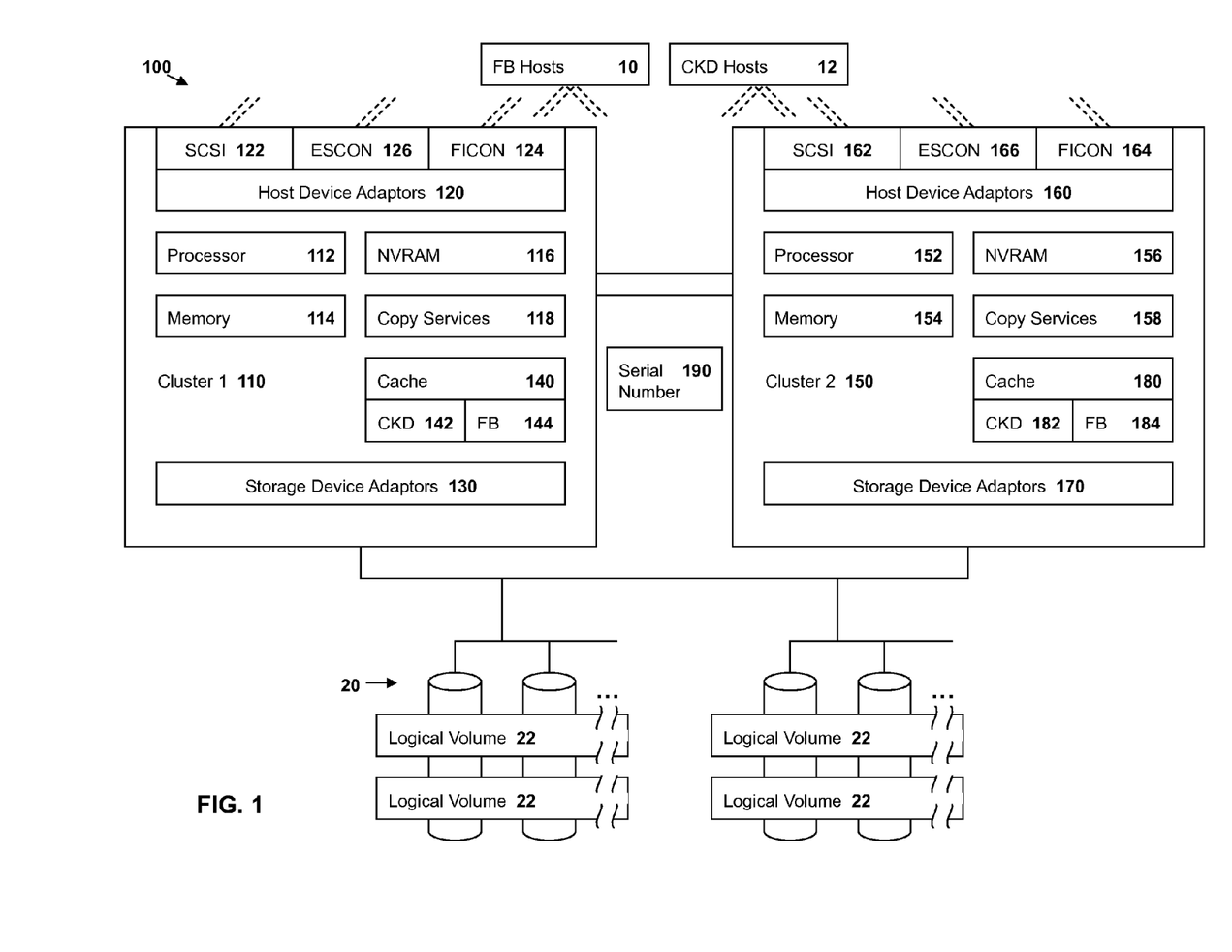
FIG. 1 is a block diagram of a customer device in which the feature key of the present invention may be used.

FIG. 1 is a block diagram of an exemplary customer device, such as an IBM® Enterprise Storage Server® (ESS) 100, in which a feature key of the present invention may be used. Although the present invention may be implemented on numerous types of systems and is not limited to implementation on any particular system, it will be described herein in the context of an ESS as a target system. The ESS 100 is typically divided into two comparable clusters 110 and 150. One or more host devices 10 and 12 are attached to each cluster 110 and 150 through host device adapters. Physical storage devices 20 (such as arrays of hard disks), configured into a plurality of logical volumes 22, are attached to the clusters 110 and 150 through storage device adapters 130 and 170. A single ESS 100 can accommodate hosts and storage devices of different architectures, such as fixed block ("FB") architecture and count key data ("CKD") architecture. Thus, there may be one or more FB hosts 10 attached to the ESS 100 clusters 110 and 150 through SCSI adapters 122 and 162 and may be one or CKD hosts 12 attached to the ESS 100 clusters 110 and 150 through FICON® adapters 124 and 164 or through ESCON® adapters 126 and 166.

Each cluster 110, 150 also includes a processor 112, 152, a memory 114, 154 for storing instructions executable by the processor 112, 152, and a non-volatile memory 116, 156. Each cluster 110, 150 further includes a cache 140, 180 which can be configured to accommodate CKD formatted data 142, 182, FB formatted data 144, 184, or both. The hardware on the two clusters of the ESS 100 may be logically partitioned through imbedded firmware such there may be more than one ESS image running, each with its own set of dedicated of processors, memory, cache, NVS, host device adapters, storage device adapters, and physical storage devices. As such, FIG. 1 may also represent the configuration of each ESS image on an ESS. Finally, each image may be configured with one or more copy services 118, 158. Examples of copy services 118, 158 include, but are not limited to, peer-to-peer remote copy (PPRC), extended remote copy (XRC), flash copy and concurrent copy (CC).

The ESS 100 also includes a serial number 190 embedded by the manufacturer to uniquely identify the particular customer device. Where there is more than one ESS image configured, each ESS image is assigned a unique serial number that is derived from the ESS serial number 190.

Figure 2:
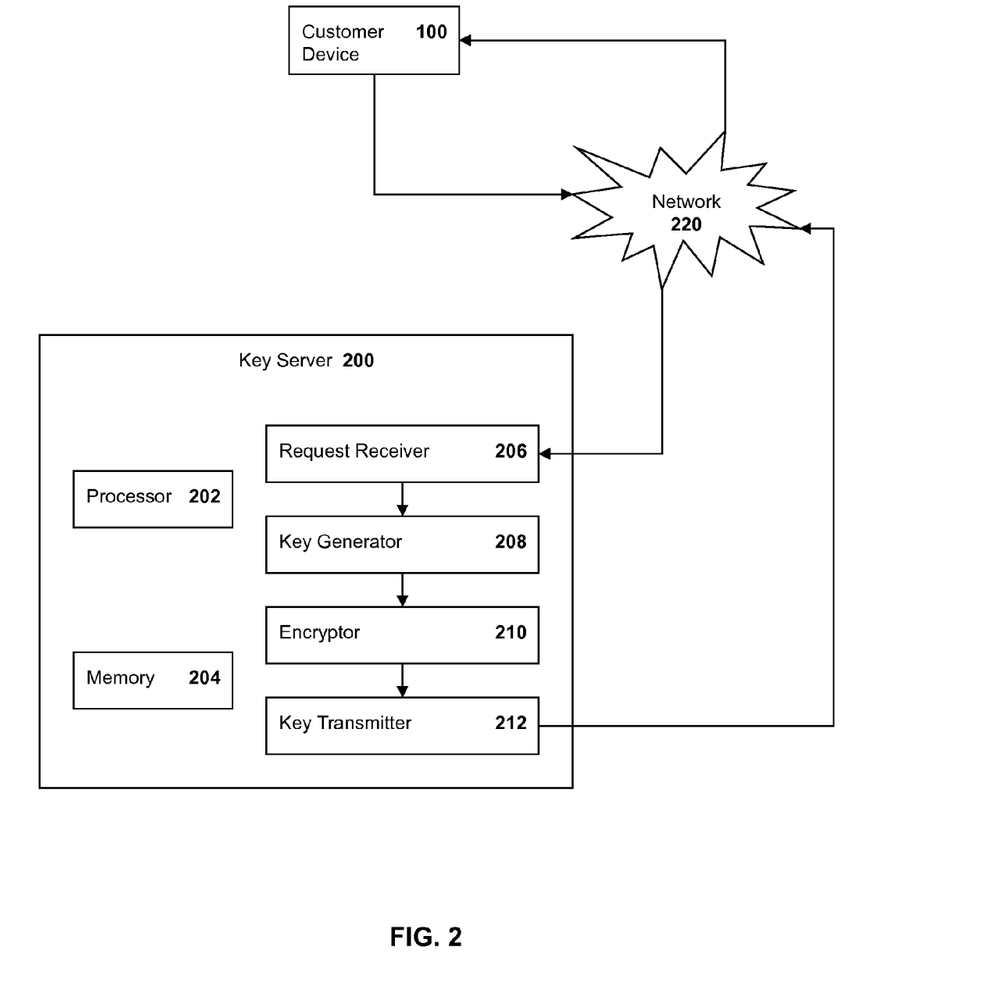
FIG. 2 is a block diagram of a server in which a feature key generator of the present invention may be implemented.

FIG. 2 schematically represents a server 200 which may be used to generate and transmit a feature key to a customer device 100 through a network 220, such as the internet, a dial-up up network or any other type of interconnecting network. The server 200 includes a processor 202 and a memory 204 for storing instructions executable by the processor 202. The server 200 further includes a feature key request receiver 206, a key generator 208, an encryption module 210 and a key transmitter 212, all under the control of the processor 202.

Figure 3:
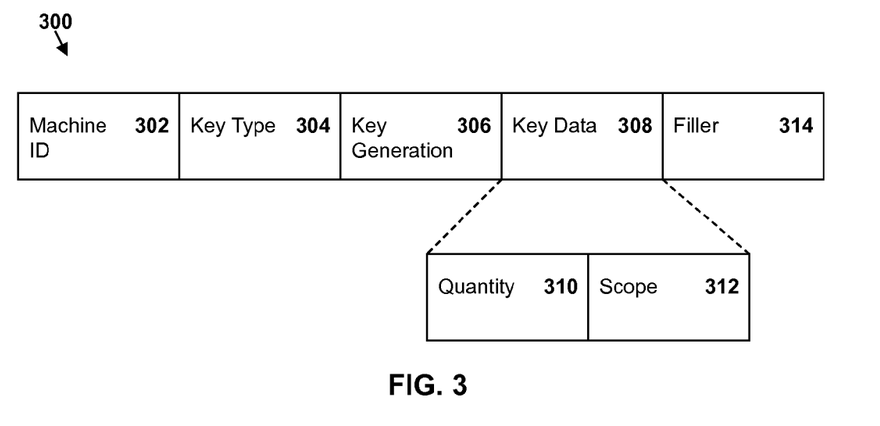
FIG. 3 illustrates the fields of an exemplary feature key.

FIG. 3 illustrates the decrypted format of an exemplary feature key 300 of the present invention. It will be appreciated that the invention is not limited to the fields or their order illustrated in FIG. 3. A first field 302 contains all or a portion of the serial number of the target ESS image; that is, the "virtual" customer device 100 on which the feature is to be enabled. In one embodiment, the first field 302 contains 25 bits, allowing the key 300 to include five characters (preferably the five lowest order characters) of the serial number which are encoded in a five bit field as one of 32 possible characters. When received by the target ESS image and compared with the ESS image's serial number, the first field 302 may be used to verify that the key 300 has actually been generated for the target ESS image and not for another system.

A second field 304 contains a key type, identifying a feature on the target ESS image which is to be enabled by the key 300. In one embodiment, the field contains eight bits, thus accommodating up to 256 different features.

A third field contains an optional key generation number 306 that is used to prevent prior keys from remaining valid and being reused. Beginning with the first key generated for a target ESS image being generation 0, the generation number for each successive key is incremented by one. When the key 300 is received by the target ESS image, the target image confirms that the generation number of the new key is one more than the immediately preceding key in the sequence of generation numbers. If the generation field 306 is a ten bit field, up to 1024 generations are provided before rolling over to restart at generation 0. It will be appreciated that a longer field will provide a greater number of possible generations and thereby increase the difficulty of trying to defeat the key reuse protection.

Depending on the key type, additional key data may be included in the key that further defines characteristics of the type of enablement. The key data 308 may include a quantity field 310 that indicates the quantity of enablement associated with the key type. For example, the feature type may apply to a given resource of the ESS image such as storage, memory, or processors and the quantity specifies an amount of these resources that can be configured on the target system while this feature is active. To ensure that the LMC key 300 regulates the appropriate level of enablement, the LMC key 300 is not accepted if it specifies a quantity that is already exceeded by the existing configuration and additionally, once accepted, the configuration of the resource is limited to the quantity in set of LMC keys that specify a quantity limit for the resource. In one embodiment, the quantity value 310 is a two-part number. A first part provides a base or mantissa while the second part, herein referred to as an exponent ("exp"), provides part of a scaling factor. In one embodiment, the base is a 10-bit number, providing initial values of 0-1023, and the exponent is a 4-bit number. The scaling factor may be created as $2^{5*exp}$ and is multiplied by the base to obtain the enabled quantity. The values 0-1023 are represented with exp=0. All successive ranges use a mantissa in the range of 32-1023 (e.g. exp=1, mantissa=32 represents 1024 which is the next larger value that can be represented above 1023). Although other exponents and scaling factors may be selected, $2^5$ was selected because it allows numbers from 1 to $2^{84}$ to be represented by 14 bits (i.e. the key size is limited) and the overlapping of the scaling ranges at the square root of the mantissa ($SQRT(2^{10})=2^5$) allows better precision across the represented range (e.g. the distance between successive values x(n) and x(n+1) is $<=1/32x(n+1)$). This allows the quantity field 310 to be used for a variety of purposes where different ranges may be required (for example, processors may be in range of 1-100, memory might be in the range of 1 GB-1 TB, capacity might be in the range of 1 TB 1 PB).

The key data 308 may also include a scope field 312 that identifies a subset of the type of resource to which the feature type and quantity are applicable. For example, on an ESS image, capacity may be allocated to either fixed block or CKD logical volumes. A given feature type may be enabled on CKD capacity, fixed block capacity, or both CKD and FB capacity. For this example, a two bit scope field 312 provides the necessary three indications. Other feature types may have other resource sub-types and the length of the field 312 must be sufficient to encode the desired permutation of applicable resource sub-type combinations.

Another field 314 containing filler bits may be included in the key 300 to accommodate other fields to be added in the future or to round up the size of the key 300 to an even number of bytes, such as eight.

Figure 4:
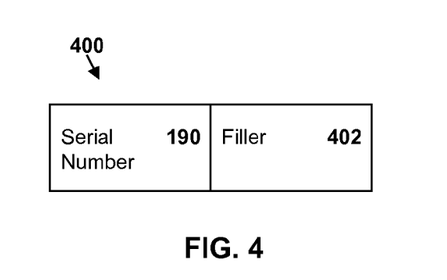
FIG. 4 illustrates the fields of an exemplary machine signature.

FIG. 4 illustrates the decrypted format of an exemplary machine signature 400 of the present invention. There is one and only one machine signature that is applicable to a particular ESS or customer device. The machine signature contains all or a portion of the serial number 190 of the ESS system 100 and may include a field 402 containing filler bits to accommodate other fields to be added in the future or to round up the size of the key 300 to an even number of bytes, such as eight. In one embodiment, the serial number 190 is encoded using the same format as used in the LMC feature key 300. The encrypted machine signature 400 is obtained from the target machine's GUI interface.

Figure 5:
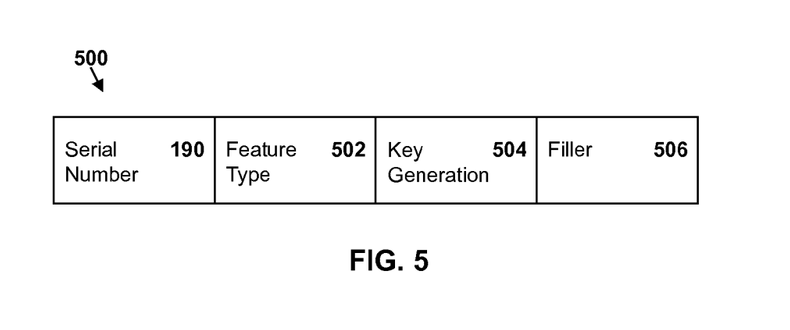
FIG. 5 illustrates the fields of an exemplary key signature.

FIG. 5 illustrates the decrypted format of an exemplary key signature 500 of the present invention. Each LMC feature key 300 installed on an ESS image or "virtual" customer device has an associated key signature 500. The key signature 500 contains all or a portion of the serial number of the target ESS image, a feature type field 502, a key generation field 504, and may include one or more fields 506 containing filler bits to accommodate other fields to be added in the future or to round up the size of the key 300 to an even number of bytes, such as eight. In one embodiment, the serial number 190 is encoded using the same format as used in the LMC feature key 300 and the feature type 502 and key generation 504 may have the same value as the corresponding fields 304, 306 of the associated LMC feature key 300. The encrypted key signature 500 for a given LMC feature key 300 on a given ESS image is obtained from the ESS machine's GUI interface.

Figure 6:
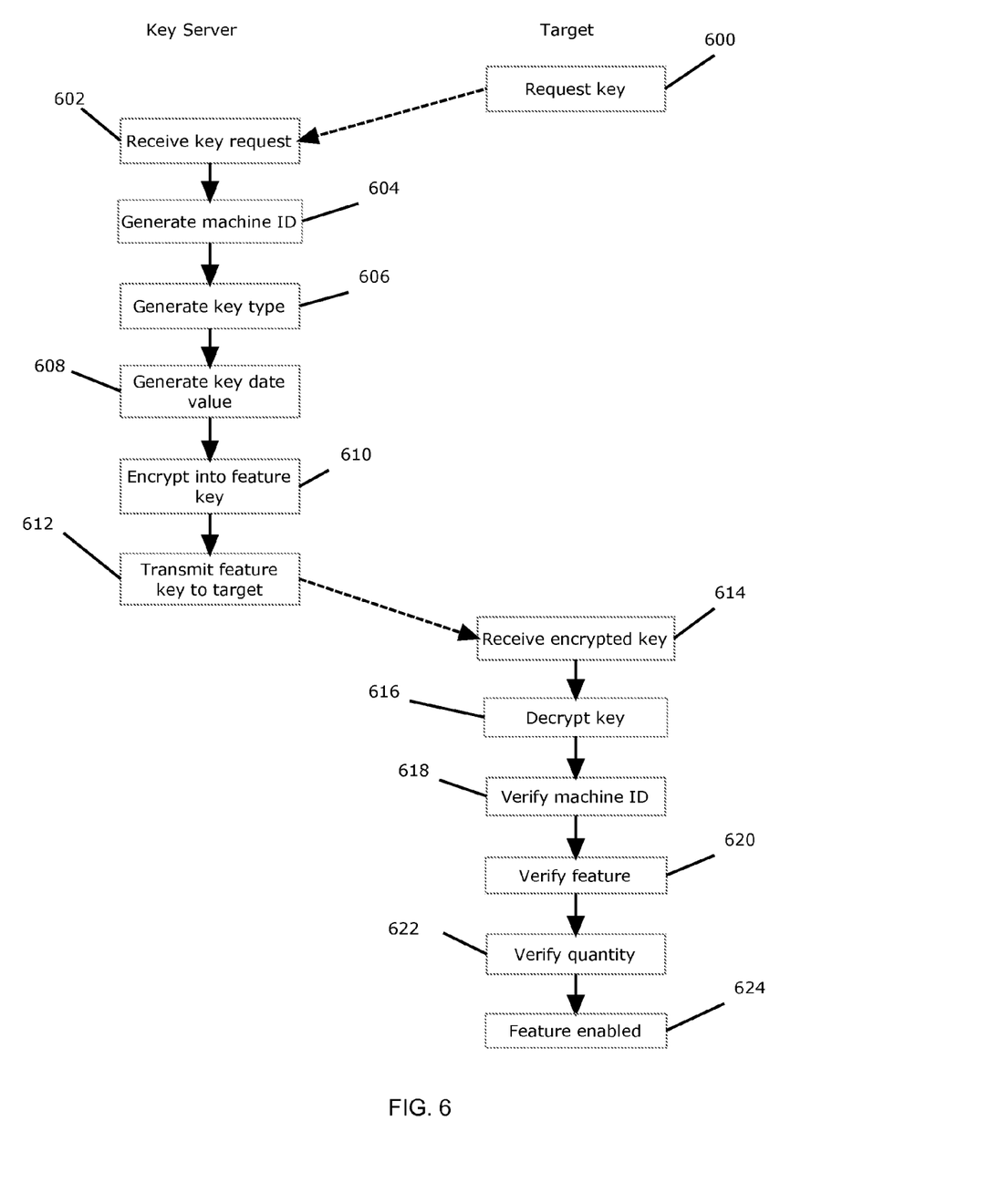
FIG. 6 is a flow chart of a method of the present invention.

Referring again to FIG. 2 and to FIG. 6, in operation, a customer desiring to change the configuration of the ESS or other customer device 100 transmits a key request through the network 220 to the server 200 (step 600). The request includes the serial number 190 of the customer device 100 and the machine signature 400. The ESS machine 100 encrypts the machine signature 400 with an encryption key based on the machine serial number 190 and key server 200 knows how to decrypt the machine signature 400 with knowledge of the machine serial number 190. The receiver 206 in the server 200 receives the request (step 602) and uses the machine serial number 190 included in the request to decrypt the machine signature 400. If the machine serial number 190 in the decrypted machine signature matches the machine signature 400 in the request, the key server 200 allows the customer access to that machine's LMC feature information. Such validation prevents someone without access to a given physical machine from gaining access to the LMC feature information for that machine. The LMC feature information is a consolidated list of all feature types enabled on the machine 100 and other related information such as the quantity of enablement and the scope of enablement for each feature type. The list is generated by considering all feature codes ordered for the machine 100 as recorded in a database or other source of machine information. There may be multiple feature codes ordered for a given feature type where different feature codes may specify a given unit of enablement (e.g. 1, 10, 100) for a given feature type and the quantity of enablement for the machine is the sum of the units of enablement in all feature codes ordered for that feature type. If there is only a single image on the target device, then all enabled feature types are applicable to that image. If there is more than one image on the target device, the customer may request the available enablement for a given key type be distributed across the available images such that the sum of all enablements on all images is less than or equal to the total enablement for that feature type on the target system 100. Once the allocation of enabled feature keys to ESS images is defined, the receiver 206 then passes the request to the key generator 208. The key generator 208 creates a set of LMC feature keys 300 for all ESS images on the ESS system 100 being processed, each LMC feature key 300 containing the appropriate fields to enable the desired feature types with the desired quantity and scope on the applicable ESS images (steps 604, 606, 608). After each key 300 is created, it is preferably encrypted in the encryption module 210 (step 610). The encryption module 210 may encrypt the key 300 in any known manner but, for additional security, will preferably use all or part of the serial number 190 of the customer device 100 to generate the encryption key. The ESS system (i.e. customer device) 100 uses the same algorithm to generate the decryption key using the ESS system serial number 190 such that the device 100 will only correctly decrypt LMC feature keys 300 which were generated for one of the ESS images on the ESS system 100.

After the keys 300 are encrypted, they may be either transmitted by the transmitter 212 through the network 220 back to the applicable ESS images (i.e. customer device) 100, loaded to a storage medium which can be subsequently accessed through functions provided by the machine GUI interface to cause them to be transmitted to the applicable ESS images, or provided to the customer in a human readable format (e.g. the encrypted bytes of the key could be represented as a string of hexadecimal numbers) so that they may be manually entered on the applicable ESS images through functions provided by the machine GUI interface (step 612).

Upon receipt of the key 300 (step 614), logic in the customer device 100 attempts to decrypt the key 300 using its serial number 190 in the decryption algorithm (step 616). If decryption is successful (verifying in the process that the embedded ESS Image ID 302 matches at least a portion of the ESS Image serial number 190 (step 618)), logic then verifies that: the feature type is supported by the ESS image (step 620); the generation number 306, if used, is one greater than the generation number used on the preceding key for this feature type; the scope, 312, if used, specifies resource subsets that are available on the customer device 100; and the quantity 310, if used, does not exceed the configured resources specified by the scope on the customer device 100 (step 622). If the key 300 fails any of the verification tests, it is rejected.

Upon receipt of the key 300 (step 614), logic in the customer device 100 attempts to decrypt the key 300 using its serial number 190 in the decryption algorithm (step 616). If decryption is successful (verifying in the process that the embedded ESS Image ID 302 matches at least a portion of the ESS Image serial number 190 (step 618)), logic then verifies that: the feature type is supported by the ESS image (step 620); the generation number 306, if used, is one greater than the generation number used on the preceding key for this feature type; the scope, 312, if used, specifies resource subsets that are available on the customer device 100; and the quantity 310, if used, does not exceed the configured resources specified by the scope on the customer device 100 (step 622). If the key 300 fails any of the verification tests, it is rejected.

If the key 300 is valid, the indicated feature type is enabled on the ESS image on the resource subset specified by the scope 312 and in the quantity 310 of enablement indicated in the key 300 (step 624). The customer device 100 subsequently generates a key signature 500 for each installed LMC feature key 300. The key signature 500 may then be used to verify to the key server 200 that a given LMC feature key 300 with a specific ESS Image serial number, feature type, and key generation has actually been enabled on a given ESS image 100. The signature 500 may be used by the key server 200 to maintain a record of what features have been enabled, and in what quantities, on each customer device and each subset of each device.

As an example, assume that the customer device 100 is divided into N images, each of which has its own set of feature keys. If the vendor operating the key server 200 offers a feature which is applicable to the customer device 100 and able to be shared across the images, it is important to the vendor to manage the distribution of the feature to prevent the sum of enablements on all images from exceeding the enablement authorized for the machine. Thus, it is important for the vendor, through the key server 200, to know which keys are active on which images. More specifically, if the customer device 100 is licensed to 100 units of a feature and the customer wants to install 20 units on image 1 and 80 units on image 2, the customer may request keys from the key server 200. After validating the license, the server 200 generates and transmits two keys of generation 0 for installation of 20 and 80 units on the first and second images, respectively. Some time later, the customer wants to modify the configuration and install 80 units on image 1 and 20 units on image 2. Rather than obtain a new key allowing the installation of 80 units of the feature on image 1, which would not prevent the simultaneous use of the original 80 units on image 2, the user first requests a key for 20 units of the feature on image 2. The key, of generation 1, is installed and a new key signature generated and transmitted to the server 200 by the customer device 100 or manually provided by the customer after receiving it from the machine GUI. Now the key server 200 will permit the user to request a key for the 80 units of the feature on image 1, also of generation 1. The new key generation number supercedes the prior generation number, thus disabling the prior key. This prevents the customer from attempting to install the original key for 80 units on image 2.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to an apparatus, the need in the art may also be met by a method, a computer program product containing instructions, or a method for deploying computing infrastructure comprising integrating computer readable code into a computing system.

What is claimed is:

1. A method for generating a key to enable an authorized feature on a computerized system, the method comprising the following steps:

receiving a request for a key to enable an authorized feature on a target system, the request including a serial number of the target system;

generating a machine identifier identifying at least a portion of the serial number of the target system;

generating a key type identifying a feature to be enabled on the target system;

generating a key data value identifying a quantity of enablement associated with the key type;

encrypting the machine identifier, the key type and the key data value into a feature key;

transmitting the feature key from the key server to the target system;

verifying that the machine identifier corresponds with the portion of the serial number of the target system and the key type identifies a feature supported on the target system;

after verifying that the machine identifier corresponds with the portion of the serial number of the target system and the key type identifies a feature supported on the target system, enabling the feature only in the quantity indicated by the key data value on the target system for the key type;

incrementing a key generation number by one over the key generation number of a currently installed feature key for the feature to be enabled on the target system;

encrypting the key generation number into the feature key;

determining whether the key generation number is not one greater than the key generation number of the currently installed feature key for the feature type; and rejecting the feature key, by the target system, after determining that the key generation number is not one greater than the key generation number of the currently installed feature key for the feature type.

2. The method of claim 1, wherein the target system includes a storage system, the method further comprising:

generating a resource scope identifying on which of a plurality of storage architectures the feature is to be enabled and whether a resource is not installed in the target system;

encrypting the storage type into the feature key; and rejecting the feature key is rejected by the target system after the resource scope identifies that a resource is not installed in the target system.

3. The method of claim 2, wherein the storage architectures are selected from the group comprising count key data (CKD) architecture and fixed block architecture.

4. The method of claim 2, further comprising:
generating the machine identifier to identify a ESS image on the target system, whereby the feature key is applicable to the identified ESS image.

5. The method of claim 1, wherein:
the quantity identified in the key data value comprises a base equal to $2^N$, a mantissa having 2N bits, and an exponent (exp); and
the quantity is calculated as the mantissa*base$^{exp}$.

6. The method of claim 1, wherein the request further includes a machine signature, the method further comprising:
using the serial number of the target system to decrypt the machine signature and verify the validity of the request; and
verifying that the machine signature includes the serial number of the target system.

7. The method of claim 1, wherein encrypting the machine identifier, the key type and the key data value into a feature key comprises employing at least part of the serial number of the target system in an encryption algorithm.

8. A method for enabling a feature in a computerized system, the method comprising:
requesting a feature key from a key server to enable a feature on the system, the request including a serial number of a target system;
receiving an encrypted key from the key server;
decrypting the key into a machine identifier, a key type identifying the feature to be enabled on the target system and a key data value identifying a quantity of enablement associated with the key type;
verifying that the machine identifier corresponds with at least a predetermined portion of a serial number of the target system;
verifying that the feature identified by the key type is supportable on the target system;
verifying that the quantity identified by the key data value is supportable on the system;
enabling the feature on the target system in the quantity identified by the key data value for the key type;
further decrypting the feature key into a key generation number for the feature to be enabled on the target system;
determining whether the key generation number is not one greater than the key generation number of the currently installed feature key for the feature type; and
rejecting the feature key, by the target system, after the key generation number is determined not to be one greater than the key generation number of a currently installed feature key for the feature type.

9. The method of claim 8, wherein the system comprises a storage system, the method further comprising:
further decrypting the feature key into a resource scope identifying on which of a plurality of storage architectures the feature is to be enabled and whether a resource is not installed in the target system; and
rejecting the feature key after the resource scope identifies that a resource is not installed on the system.

10. The method of claim 9, wherein the storage architectures are selected from the group comprising count key data (CKD) architecture and fixed block architecture.

11. The method of claim 9, wherein the feature key is further decrypted into a machine identifier to identify a ESS image on the storage system, whereby the feature key is applicable to the identified ESS image.

12. The method of claim 11, further comprising:
further decrypting the feature key into a key signature; and
allocating the quantity associated with the feature type among a plurality of ESS images on the system.

13. The method of claim 8, wherein requesting the key comprises transmitting the request to the server over the Internet.

14. A computer program product in a computer readable storage medium usable with a programmable computer, the computer program product having computer-readable code embodied therein for generating a feature-enabling key, the computer-readable code when executed by a processor of the programmable computer cause the programmable computer to perform a method, the method comprising:
receiving a request for a key to enable an authorized feature on a target system, the request including a serial number of the target system;
generating a machine identifier identifying at least a portion of the serial number of the target system;
generating a key type identifying a feature to be enabled on the target system;
generating a key data value identifying a quantity of enablement associated with the key type;
encrypting the machine identifier, the key type and the key data value into a feature key;
transmitting the feature key to the target system;
verifying that the machine identifier corresponds with the portion of the serial number of the target system and the key type identifies a feature supported on the target system;
enabling the feature only in the quantity indicated by the key data value on the target system for the key type after verifying that the machine identifier corresponds with the portion of the serial number of the target system and the key type identifies a feature supported on the target system;
generating a key generation number by one over the key generation number of a currently installed feature key for the feature to be enabled on the target system;
encrypting the generation number into the feature key;
determining whether the key generation number is not one greater than the key generation number of the currently installed feature key for the feature type; and
rejecting the feature key, by the target system, after the key generation number is determined not to be one greater than the key generation number of the currently installed feature key for the feature type.

15. The program product of claim 14, wherein the target system includes a storage system, the program product further comprising instructions for:
generating a resource scope identifying on which of a plurality of storage architectures the feature is to be enabled and that a resource is not installed in the target system;
encrypting the storage type into the feature key; and
rejecting the feature key by the target system after the resource scope identifies that a resource is not installed in the target system.

16. The program product of claim 15, wherein the storage architectures are selected from the group comprising count key data (CKD) architecture and fixed block architecture.

17. The program product of claim 14, further comprising instructions for:
generating a machine identifier to identify a ESS image on the storage system,
whereby the feature key is applicable to the identified ESS image.

18. The program product of claim 14, wherein:
the quantity identified in the key data value comprises a base equal to $2^N$, a mantissa having 2N bits, and an exponent (exp);
the quantity is calculated as mantissa*base$^{exp}$.

19. The program product of claim 14, wherein the request further includes a machine signature, the instructions further comprising instructions for:

using the serial number of the target system to decrypt the machine signature and verify the validity of the request; and verifying that the machine signature includes the serial number of the target system.

\* \* \* \* \*